Figure 1:
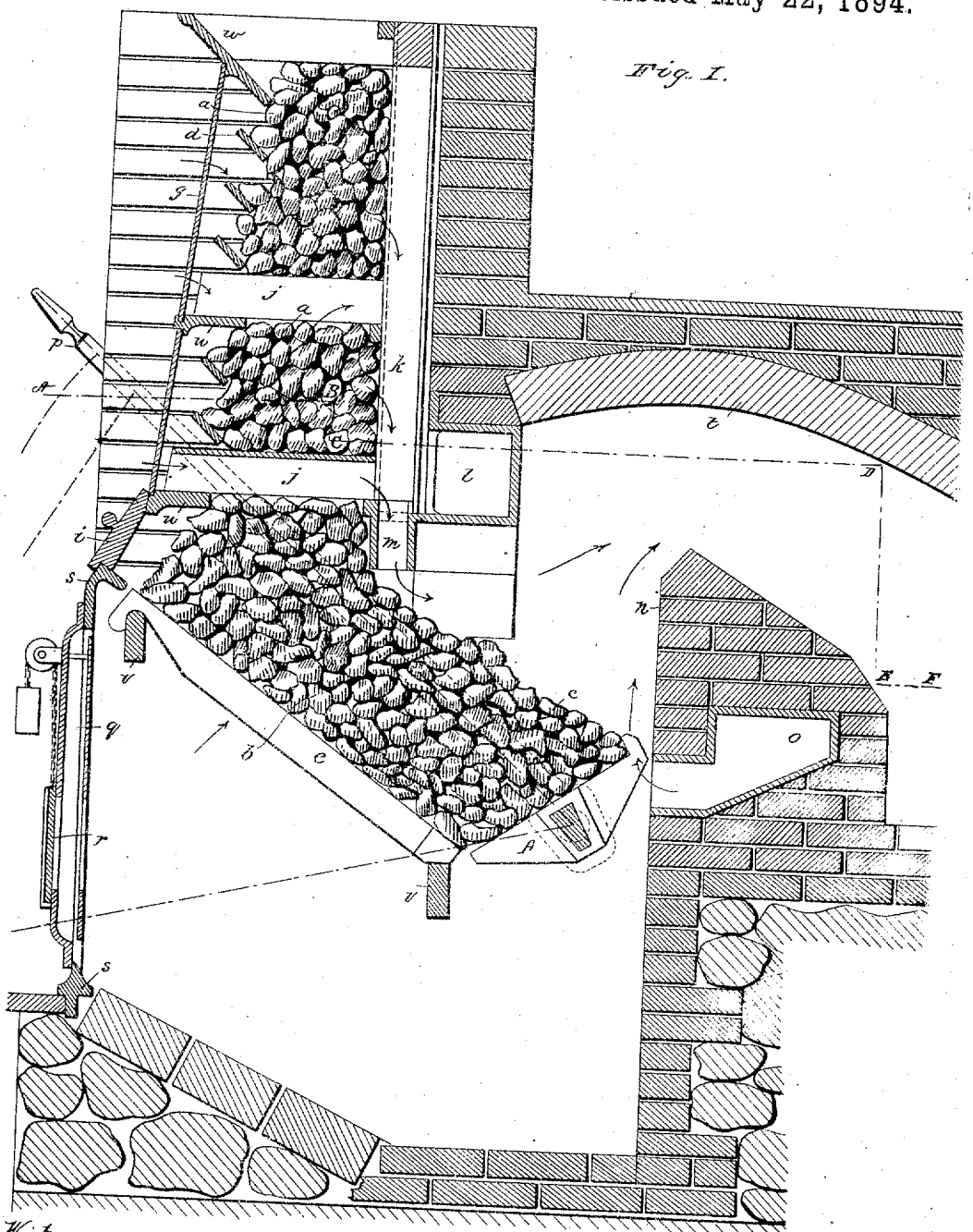

8 Sheets—Sheet 1.

J. HINSTIN.

FURNACE.

No. 11,420.

Reissued May 22, 1894.

Fig. I.

Witnesses.

W. P. Edelen,

Samuel H. Fishs.

Inventor.

Joseph Hinstin by Pollard & Mann his attorney

J. HINSTIN.
FURNACE.

8 Sheets—Sheet 2.

No. 11,420.

Reissued May 22, 1894.

Witnesses.
W. R. Edelin.
Samuel W. Fisher.

Inventor
Joseph Hinstin
by Pollock & Manno
his attorneys.

J. HINSTIN.

FURNACE.

No. 11,420.

Reissued May 22, 1894.

Witnesses

W. R. Edelin.

Samuel H. Fisher

Inventor.

Joseph Hinstin by Poland & Macco his attorneys.

J. HINSTIN.

FURNACE.

No. 11,420. Reissued May 22, 1894.

Witnesses
W. D. Edelen
Samuel H. Fisher

Inventor.
Joseph Hinstin
by Poole & Maxwell
his attorneys

8 Sheets—Sheet 5.

J. HINSTIN.

FURNACE.

No. 11,420.

Reissued May 22, 1894.

Witnesses.

W. R. Edelin.

Samuel H. Fisher.

Inventor.

Joseph Hinstin by Pollard & Mauro his attorneys.

J. HINSTIN.
FURNACE.

8 Sheets—Sheet 6.

No. 11,420.

Reissued May 22, 1894.

Witnesses
W. R. Edelen
Samuel H. Fisher

Inventor
Joseph Hinstin
by Poole & Maus
his attorneys

8 Sheets—Sheet 7.
J. HINSTIN.
FURNACE.
No. 11,420.
Reissued May 22, 1894.
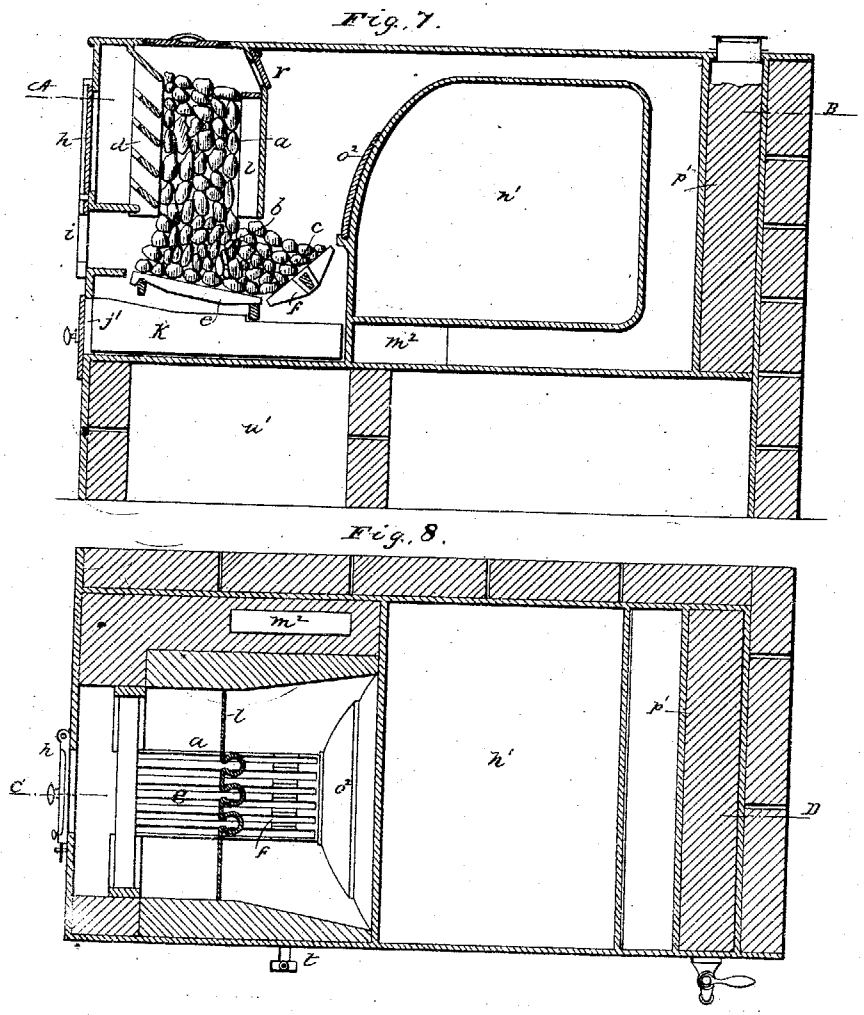
Witnesses.
H. R. Edelin.
Samuel H. Fisher
Inventor
Joseph Hinstin
by Poole & Maney
his attorneys

J. HINSTIN.

FURNACE.

No. 11,420. Reissued May 22, 1894.

Witnesses
W. R. Edelin.
Samuel H. Fisher

Inventor
Joseph Hinstin
by Pollok & Mauro.
his attorneys

UNITED STATES PATENT OFFICE.

JOSEPH HINSTIN, OF PARIS, FRANCE.

FURNACE.

SPECIFICATION forming part of Reissued Letters Patent No. 11,420, dated May 22, 1894.

Original No. 468,875, dated February 16, 1892. Application for reissue filed March 22, 1894. Serial No. 505,362. Patented in France December 29, 1890, No. 210,497.

*To all whom it may concern:*

Be it known that I, JOSEPH HINSTIN, a citizen of the French Republic, residing at Paris, in said Republic, have invented certain new and useful Improvements in Furnaces, (patented in France December 29, 1890, No. 210,497,) of which the following is a full, clear, and exact description.

This invention relates to the construction of furnaces (including industrial furnaces, domestic heaters, fire places, &c.,) and has for its object to effect the complete combustion of the fuel.

Furnaces or heaters constructed according to this invention are characterized by three combustion chambers or spaces, or as they may be most aptly termed "foyers," having a certain definite relation to one another, and having each a distinct part in the complete combustion of the fuel and gaseous products, which is the function of the apparatus as a whole. These three spaces or foyers, constituting together a complete combustion chamber, will be herein referred to respectively as the first or front foyer, the second or middle foyer and the third or back foyer. The foyers are not separated by definite boundaries or partitions, and on the contrary the fuel extends in a continuous mass through them all; but each is distinct and independent of the others with respect to its air inlets or supply, and its discharge of mixed gas and air, and with reference to the character of the combustion taking place within it, all of which will be evident from the detailed explanations hereinafter given.

The principal characteristics of the several elements of the invention will now be briefly stated.

First. The first foyer is the space in which are effected the distillation of the fuel and the mixture of the gases resulting therefrom with sufficient quantities of air. This foyer has a collecting space, flue or passage (or several of them) at the rear or side, by which the mixture of gases and air becoming more and more heated, is conveyed and discharged over the incandescent fuel of the middle and rear foyers. The first foyer is bounded on one side by grate-bars of variable form and arrangement, as hereinafter described, and may have a counter-grate, and be provided with means for admitting air in regulated quantities, and for conducting it through the mass of fuel. The employment of appliances of this kind will depend upon the character of the fuel used, and the particular application of the system.

Second. The middle foyer is not materially different in arrangement or function from the combustion chambers of ordinary furnaces or heaters. In it the distillation of gas from the fuel is continued and completed, and the formation of carbon dioxide or carbonic acid, the result of complete and thorough combustion, begins. It has grate-bars of ordinary or of any suitable construction, and means for regulating the admission of air.

Third. The back or third foyer is the space in which the combustion is completed by the transformation of the combustible gases into carbon dioxide. It is adjacent to and a continuation of the middle foyer, and bounded on the opposite side by a fire-bridge, above which is an arch or dome. The fuel in this space is supported by grate-bars, and presents a triangular section tapering to a layer of minimum thickness at the extreme rear of the chamber toward which the fuel naturally gravitates. The grate is inclined upward toward the rear and is provided with levers for moving it as desired.

In operation the mixture of air and gases is discharged downward from the first foyer just above where the fuel is thickest and consequently where there is the most abundant production of carbonic oxide, the construction of the fire chamber being such as to cause this mixture to pass as close as possible to the surface of the incandescent fuel. This current passing backward under the arch or dome of the rear foyer, meets at an angle approximating a right-angle, a current of highly heated air passing up alongside of the bridge (and therefore having the effect of preserving the latter from too rapid deterioration), these two currents meeting at a very hot part of the furnace under the dome. It follows that all combustible gases generated from the fuel, and all molecules of carbon, the products of incomplete combustion, are drawn toward this angle and being thus compressed between a double current of heated air are consumed in a manner similar to that made familiar by the well-known Bunsen burner.

The principle of the invention, as well as the details of construction in which the same may be practically applied can be most conveniently explained in connection with the accompanying drawings, which represent, by way of example, various applications of this new arrangement of furnace.

Figure 2:
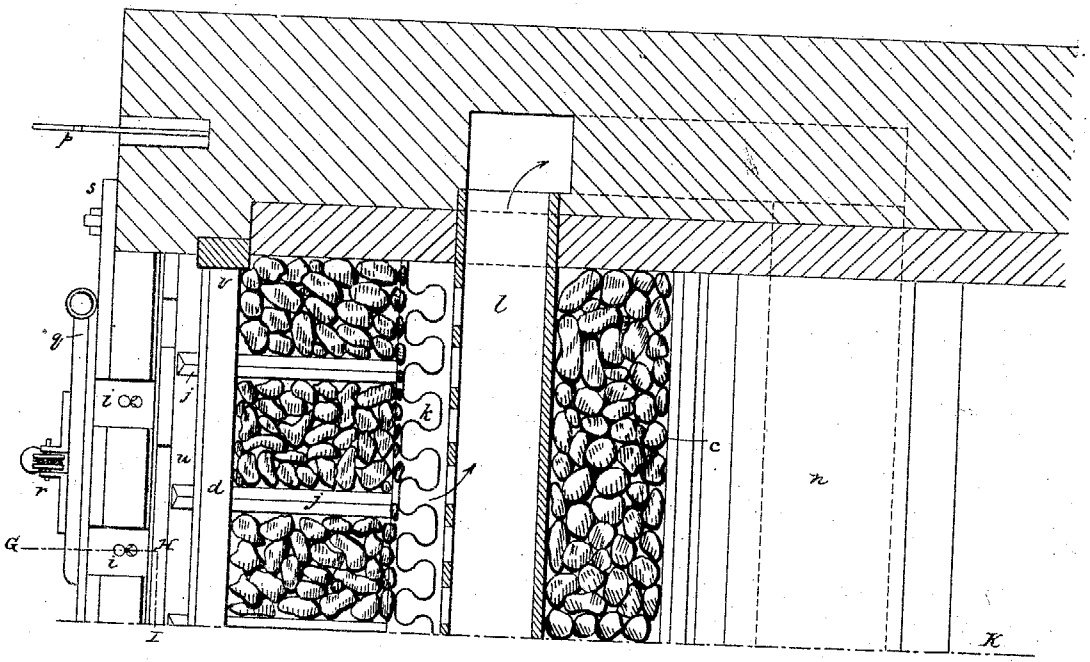
Figure 3:
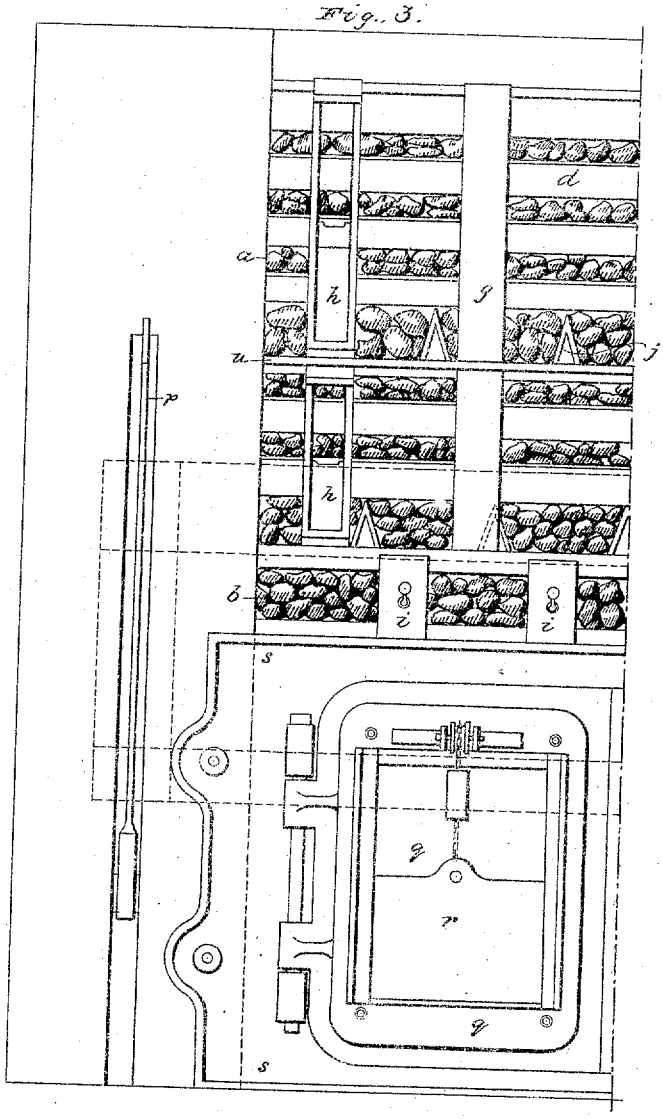
Figure 4:
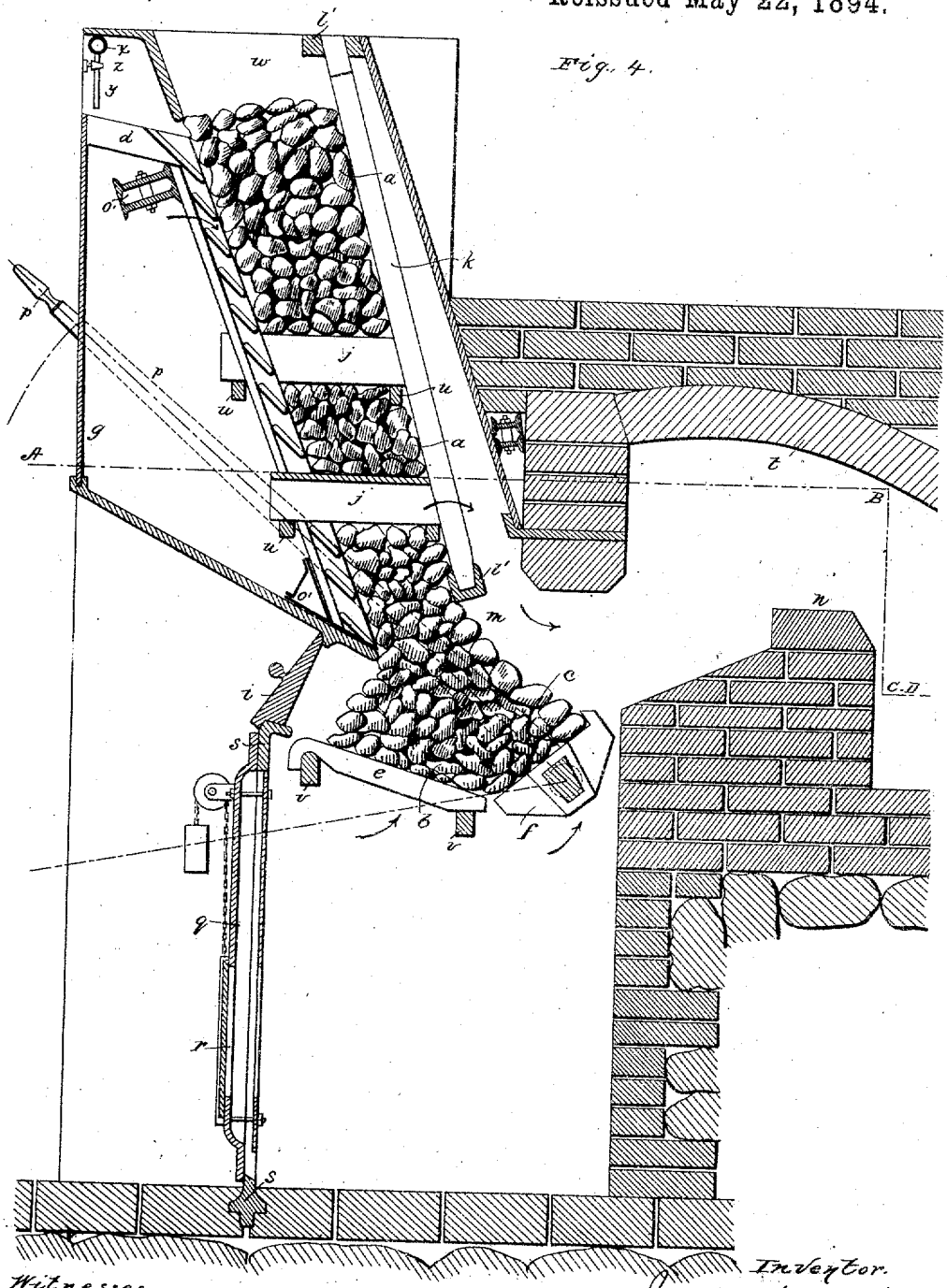
Figure 5:
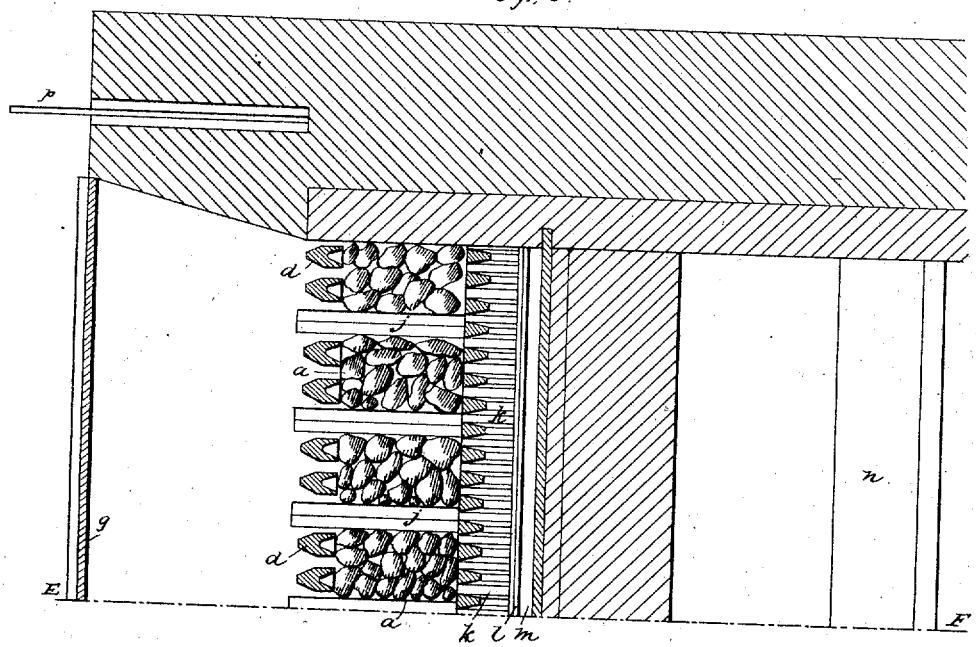
Figure 11:
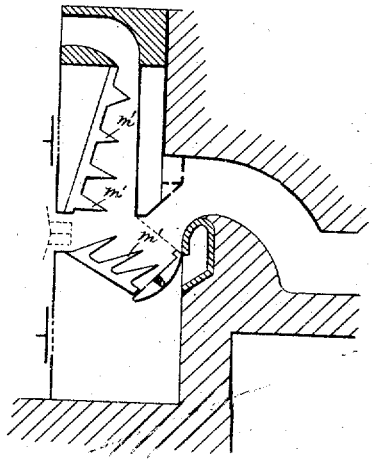
Figure 12:
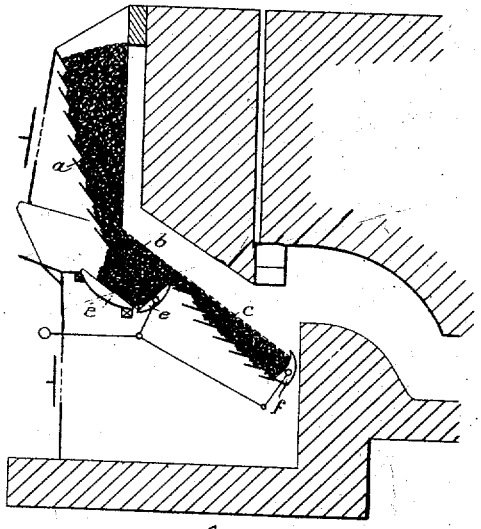
Figure 6:
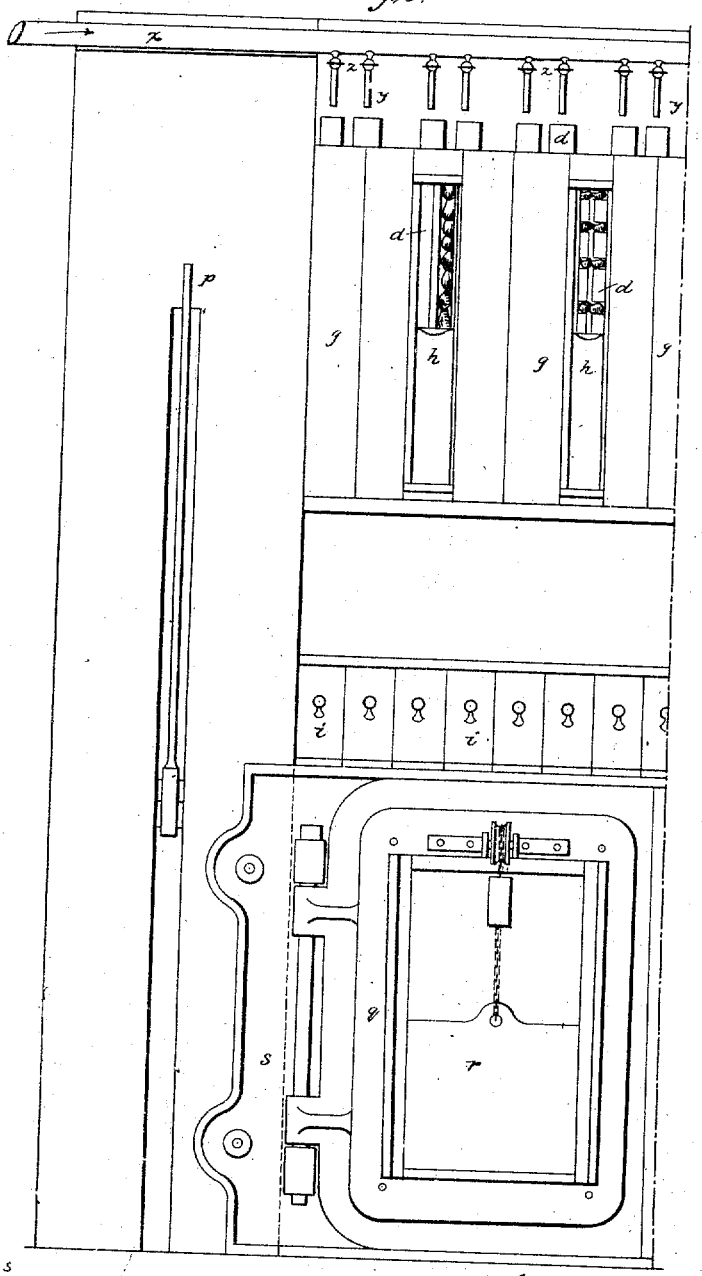
Figure 9:
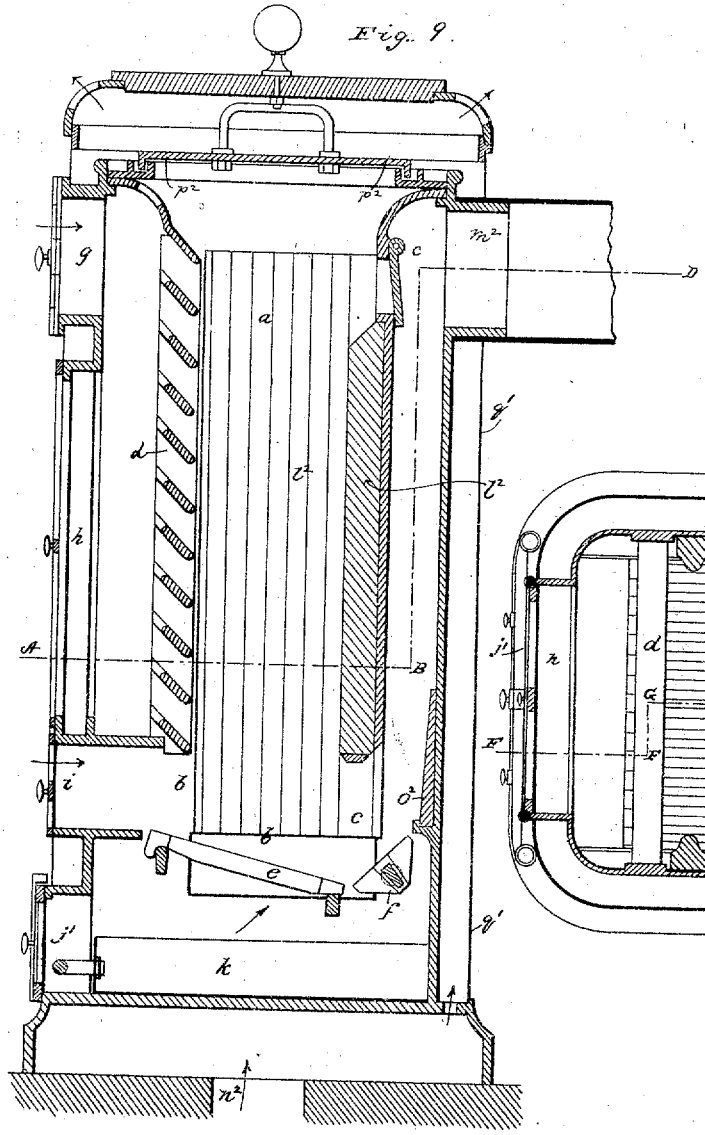
Figure 10:
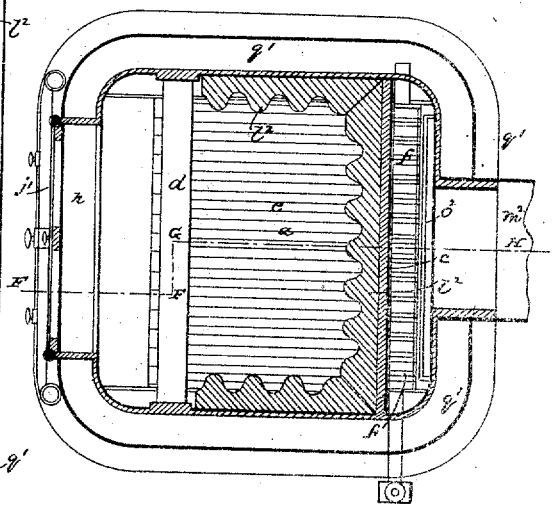

In the drawings Figure 1, represents an elevation in section on line G H I K of Fig. 2, of an industrial furnace arranged according to this invention. Fig. 2, represents a half-plan view in section of the same furnace, taken on the line A B C D E F of Fig. 1; and Fig. 3 a half-front elevation of the same furnace, the shutters forming the register for the admission of air being removed at certain points. Fig. 4 represents an elevation in section on the line E F of Fig. 5, of an industrial furnace for liquid fuel arranged according to this invention. Fig. 5 represents a half-plan view in section of the same furnace on the line A B C D of Fig. 4, and Fig. 6 a half-front elevation of the same grate. Fig. 7 is a sectional elevation of the same furnace on the line C D of Fig. 8, and Fig. 8 shows the sectional plan view of the same on the line A B of Fig. 7; Fig. 9, an elevation of the same in section on the line E F G H of Fig. 10, and Fig. 10 shows a sectional plan view of the same on line A B C D of Fig. 9. Figs. 11 and 12 show arrangements of combined furnaces for burning coke-dust, and characterized by a special combination of the grates of the furnace and of the back furnace.

In the various figures the same reference letters represent the same parts.

The various arrangements all have, first, a first foyer *a*, acting in the same way as the front part of the grate of an ordinary furnace erected vertically and overhanging the lower part which supports the incandescent coke; second, the middle-foyer *b*; third the rear foyer *c*.

The front foyer *a*, which is surmounted where necessary by a charging-hopper *w* for the fuel, is of dimensions suitable to the consumption of fuel and the time of distillation, with as large a capacity as possible, for a part of the carbonic oxide formed in the fire-chamber rises somewhat into the front foyer and may be advantageously treated like the gases from a point of view of combustion. The form to be given to the front grate will depend essentially on the nature of the fuel to be consumed therein. If the fuel is adhesive a form is preferably employed, such as is shown in Fig. 1—that is to say, the descent of the fuel may be facilitated by widening out the foyer at the bottom. If, on the other hand, the fuel be slippery, fine and dry, it would be preferable to sustain it by having the narrower section below and by using flat grates. The air necessary for producing the mixture with the gases of the fuel is introduced into this foyer by a grate *d*, which may also be of various forms and sections, according to circumstances and requirements. The grate-bars may be arranged vertically or horizontally, as required, and may be of different useful forms. In the arrangement especially of the grate held up by supports *o′ o′* (shown in Figs. 4 and 5) heavy oils may be caused to run into the hollow parts of the bars, which oils could be fed by the pipe *x* and distributed by the tubes *y*, having taps *z*, these oils burning simultaneously with the solid combustibles. The admission of air into the first foyer is regulated by means of a regulating-register situated in the inspection-door *h*. For this purpose any combination of known devices may be employed. Opposite to the grate, for the admission of air, is the counter-grate *k*, sustained by means of supports *l′ l′* Fig. 4, and serving to keep the fuel at a suitable thickness, while allowing the air and gas after having passed through the layer of fuel to reunite and become finally mixed behind this counter-grate in a chamber where the draft acts and brings the mixture over the incandescent coke. This counter-grate is made like an ordinary grate with an arrangement for cooling the bars which are nearest to the heat of the fire by means of a circulation of water or air. In certain cases this counter-grate may be advantageously replaced by a similar arrangement in brick or fire-clay, or simply, as shown in Fig. 9, by fire-clay walls, which are more or less corrugated, thereby increasing the surfaces of small resistance, if not forming actual chambers. Between the grate and the counter-grate, if it be necessary, air or gas conductors *j* are placed, Figs. 1 to 6 held up by supports *u*, intended to allow a sufficient quantity of air, which is indispensable for mixing with the gases and for their total combustion to penetrate the mass of fuel, and to facilitate the passing away of the mixture. The aeration of the fuel may in many cases, as in Figs. 7 to 9, take place of itself between the two grates, the latter being given a suitable form and the layer of fuel being of such a thickness as to allow the air easily to penetrate it; but if for any reason—such for instance, as for facilitating the descent of the fuel—it is necessary to increase the width of the layer of fuel at the bottom to such an extent that a larger quantity of air is necessary, recourse may be had to this method of aeration. This air-conductor may be made either in the form of a flat bar or in that of two bars simply, placed side by side arranged in a triangular form, or even may be made of partitions in the form of grates. The number and nature of the bars forming these gas-conductors may naturally be varied according to circumstances, and the admission of air into these conductors may be regulated, as desired by means of plugs forming registers or by any other suitable means. According to the fuel which is to be consumed, these air-conductors must have different shapes. If, for instance, the fuel is to descend easily, they must have very acute angles; but, if, on the contrary, their object is to bring air into a very compact but sliding mass—such, for instance, as coke-dust—they must assume the form of obtuse bars, thus supporting the fuel. In this particular case grate bars might even be preferably employed having projections cast in one piece with the bars *m'* in Fig. 11.

The second foyer is formed of the following parts: First, the door *i*, which may be of a shape resembling movable plugs and be perforated, and have a register allowing air to be admitted in greater or less quantity. This door, which is placed in the front *s* of the furnace, Figs. 1 to 6 is variously arranged. It may be usually smaller than the doors of ordinary furnaces because it is not generally used for charging. It is used for lighting the fire and for assisting the cleaning. The door of the furnace may have retaining-hooks for placing paddles or pokers on under the first foyer and for holding up the fuel in case it is desired to empty the second foyer alone.

Second, the grate, which is formed by the bars *e*, as usually employed, of various more or less inclined shapes, placed according to requirements and the nature of the fuel and held up by supports *v*. The part called the "air and gas conductor" may also be made to serve for this grate, or there may be employed bars having additions of points or projections, capable of supporting the fuel while introducing into the mass the air which is necessary for the mixture with the gas in proportion as it is produced, as shown in Fig. 11. If a fine, but not adhesive fuel is to be dealt with—such, for instance, as coke-dust—the bars may be arranged in such a way that the layer of coke is as thin as possible to allow of the passage of the air. In order, however, to have at a given point a sufficient quantity to produce and maintain the incandescence, the grate may be divided into one or more parts by means of movable grates, the effect of which is not only to multiply the incandescent masses, but also to cause currents of air to pass from place to place behind the movable grates (see Fig. 12).

Third, the regulating register *r* for the admission of air under the grate, is fixed in the door of the ash-pan *q* and it is made in any suitable known manner.

The second foyer effects the progressive heating of the fuel of the first foyer, presents incandescent coke to the passage of the mixture of air and combustible gases and ignites it at the mouth of the combustion nozzle *m*. It also allows the layer of incandescent fuel to be tapered away to nothing in the third foyer, not only without incurring the risk of its being extinguished, but on the contrary, increasing the activity of the combustion in the third foyer because the latter is fed, and its temperature is constantly maintained, by the second foyer, where there is always a large quantity of fuel.

The third foyer *c* begins just beneath the combustion nozzle *m*, the fuel it contains being supported by a movable grate *f*. Its rear boundary is the bridge *n*, above which is the dome *t* for throwing down the flame and radiating the heat. Provision is made for the entrance of air along the upright wall of bridge *n*, as indicated by arrows (Fig. 1) to preserve it from rapid deterioration and to co-operate in the complete combustion of the volatile products. By reference to the drawings it will be seen that the mixture of air and gases collected from the front foyer, is discharged through outlet *m* over the thickest part of the fuel, and passes as close to the incandescent mass as possible without spoiling the draft, its direction being controlled by the dome *t* and the point of bridge *n*.

The movable grate *f* is composed of bars, the forms and sections of which are suited to the nature of the fuel, but connected together in such a way that the grate, as a whole, or part thereof, may turn on an axis, being moved by means of levers *p p*. The grate is arranged in such a way that one of its extremities ends at the natural line of slope of the incandescent fuel. This grate *f* may terminate at its upper end in a hook or catch (Fig. 1) which will retain the fuel and render the working of the movable grate more exact as regards the introduction of air into the back of the furnace for the purpose of effecting the total combustion of the carbonic oxide; but the movement of the grate may at the same time serve to cause the cinders contained in the incandescent fuel to fall out. For that purpose it is sufficient to give a back and forward motion to the grate by means of levers, which act directly on the axis of the grate or otherwise. In this way either the whole or a part of the grate of the second foyer *b* may be made to move at the same time by causing it to come in contact with the extremity of the movable grate. The fire-bridge *n* co-operates with the movable grate in furnishing a sufficient and controllable supply of air to enter perpendicularly to the direction taken by the combustible gases. To this end it may contain, as shown in Fig. 1, an air passage *o* extending widthwise of the furnace and supplying air along the entire width of grate *f*. It may be arranged to receive a supply of air either from the collector *l* Figs. 1 and 2, which supplies heated air, or directly from the outside of the furnace. A portion of the air from collecter *l* may also be sent to the combustion nozzle of the front foyer, or to any other desired place, and may be regulated by suitable registers.

The dome *t* for deflecting the gases and for effecting the radiation of the heat, is arranged so as best to fulfill these two purposes and as far as possible in such a way as to cause the heat to radiate to the point where the mixture of air and gas is the greatest. The object of the deflection of the flame is to complete the mixture of the air and the combustible gases, and that of the vault to complete the combustion of the mixture.

The admission of air into the third foyer is simultaneously regulated with the admission of air under the grate of the second foyer, by means of a register *r*, placed in the door of the ash-box. In the third foyer the fuel, there existing in the state of incandescent coke, and in a comparatively thin layer, is burned directly to carbonic acid gas under the action of air in excess. The first and third foyers in addition exert a final combined action for completely burning to carbonic acid, the carbonic oxide largely formed in the fuel of the middle foyer, together with the combustible gases which have escaped from the distilling action of the front foyer, and the molecules of carbon which result from incomplete combustion. The air in excess allowed to enter the register of the front foyer, and which follows the wall of the furnace, arrives above the third foyer in a thin stream which has become more and more heated and which, not having encountered any resistance, has acquired considerable velocity. Similarly the current of air which entered under the grate *f*, close to the bridge *n* and becoming thereby highly heated, also acquires a relatively high velocity. The direction of this current is approximately perpendicular to that of the first mentioned stream as indicated by the arrows in Fig. 1. It will thus be seen that the combustible gases and molecules of free carbon are drawn toward the angle formed by these two moving currents of air, and are compressed between them where they meet, according to the resultant of their convergent directions. This point is at an extremely hot part of the furnace, directly exposed to the great heat of radiation from the incandescent fuel in foyers *b* and *c*, and to the reflected heat of dome *l*. All the combustible matters, thus compressed at a point of great heat, between two currents of air, burn in a manner similar to the operation of a Bunsen burner, entirely without smoke, and further contribute to maintaining at the exit of the third foyer the highest temperature in the whole furnace.

The different furnaces, as above, have been so described under the supposition that they worked always with an oxidizing flame producing carbonic acid in order to yield the most complete combustion; but in certain cases it may be necessary to cause the furnace to work otherwise—for instance, in the case of a steam-boiler, if the temperature is too high at the point of contact with the fire, or in the case of pottery-furnaces.

In pottery furnaces when the first half of the furnace is brought to an incandescent redness, this first part may act in a similar manner to the arch above mentioned and by bringing the necessary air to this point, while the furnace is being worked with carbonic oxide, a second center of combustion is obtained, which serves to facilitate the second part of a baking in the furnace.

Some of the described parts of Figs. 1 to 6 are not found in the remaining figures, and the following details which require no particular description are found only in certain constructions: an opening $m^2$ (Figs. 7 to 10) for the escape of the smoke; a fire-clay lining $l^2$; a damper $j'$ (Figs. 7 to 10); a pastry oven $n'$, a boiler $p'$ and a coal box $v'$ (Figs. 7 and 8); an inlet $n^2$ for the admission of fresh external air; a casing $q'$ forming an air chamber and a cover $p^2$ for the charging hopper (Figs. 9 and 10).

Having now particularly described and ascertained the nature of the said invention and in what manner the same is to be performed, I declare that I wish it to be understood that the shapes, dimensions, proportions and accessory parts of the various constituent parts of this new arrangement of furnace and the materials to be used in its construction or erection may be varied as may be considered suitable without departing from the principle of my invention; but that

What I claim is—

1. The combination in a furnace of the first foyer in which distillation of the fuel occurs and the products of distillation are mixed with air, the middle foyer in which the distillation is continued and carbonic oxide produced, and the third foyer in which the fuel is supported upon a movable grate in a mass triangular in section and being provided with a bridge surmounted by an arch or dome, said third foyer being further provided with an inlet for the air and gases from the first foyer above the thickest part of the fuel, air inlets under the grate beneath such thickest part of the fuel, and another air inlet between the bridge and the adjacent end of the grate, these air inlets being controlled by regulating the angle of inclination of the movable grate, substantially as described.

2. The combination with the three combustion foyers through which the fuel progressively passes and burns, of an air and gas collector or passage at the rear of the first foyer, said collector or passage having its outlet or discharge above the incandescent coke of the second and third foyers, substantially as described.

3. The combination with the front and middle foyers, of the back foyer, a movable grate therefor provided with hot air inlets, a bridge bounding the space of the back foyer, and hot air pipes leading to said bridge from the space behind the front foyer, substantially as described.

4. The combination, in a furnace, of three combustion foyers through which the fuel progressively passes and burns, the first foyer being provided with a passage for collecting the products of distillation and mixing them with a current of air, said passage being unobstructed so that the mixture of air and gases progresses with increasing velocity; the third foyer being provided with a bridge surmounted by a dome which deflects the stream of gas and air from the first foyer, and with air inlets admitting a stream of air along the heated face of the bridge in a plane intersecting that of the stream first mentioned; so that the two streams inclose between them the entire volatile products and free carbon liberated by the incomplete combustion of the furnace, and meet at a point exposed to the direct radiation of the incandescent fuel and to the reflected heat of the dome, substantially as described.

In testimony whereof I have hereunto set my hand in presence of two subscribing witnesses.

JOSEPH HINSTIN.

In presence of—
CH. NARCELOS,
P. DE GRANDSAYNE.